United States Patent [19]

Fehlner

[11] 3,824,436

[45] July 16, 1974

[54] ACTIVE THIN FILM DEVICE BASED ON CROSSED DISCONTINUOUS THIN FILMS AND METHOD

[76] Inventor: Francis P. Fehlner, 83 E. 4th St., Corning, N.Y. 14830

[22] Filed: Mar. 9, 1973

[21] Appl. No.: 339,931

Related U.S. Application Data

[63] Continuation-in-part of Ser. No. 163,887, July 19, 1971, abandoned.

[52] U.S. Cl. ....... 317/234 R, 317/234 S, 317/234 T, 317/235 B, 307/322

[51] Int. Cl. .......... H01l 3/00

[58] Field of Search ......... 317/234 S, 234 T, 235 B; 307/322

[56] References Cited

UNITED STATES PATENTS

| | | | |
|---|---|---|---|
| 3,474,305 | 10/1969 | Szupillo | 317/234 |
| 3,500,142 | 3/1970 | Kahng | 317/235 |

*Primary Examiner*—Martin H. Edlow

*Attorney, Agent, or Firm*—Flehr, Hohbach, Test, Albritton & Herbert

[57] ABSTRACT

An active thin film device of solid state electron structure having a relatively thin layer of electronically pervious insulating material with at least one discrete portion of electronically pervious conductive material disposed on the insulating material, with at least one additional portion of electronically pervious conductive material disposed on the insulating material, the first named and additional portions in combination with the layer of insulating material forming first and second conductive regions, the first and second conductive regions being substantially free of normal electric fields. Means is used for applying a voltage to one of said conductive regions to cause electron injection therefrom into the insulating layer to thereby affect the conductivity of the other conductive region.

22 Claims, 13 Drawing Figures

INVENTOR.

Francis P. Fehlner

BY Fehr, Hohbach, Test, Albritton & Herbert

Attorneys

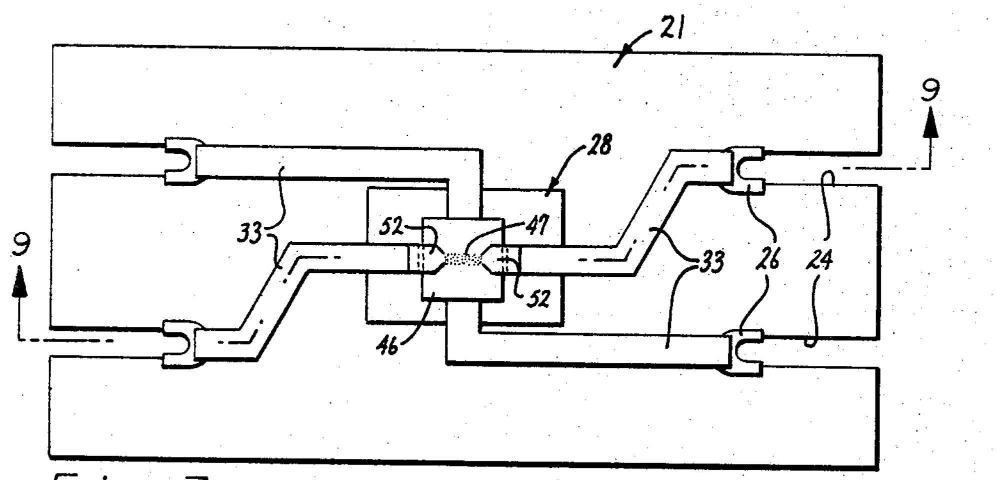
F i g. 7
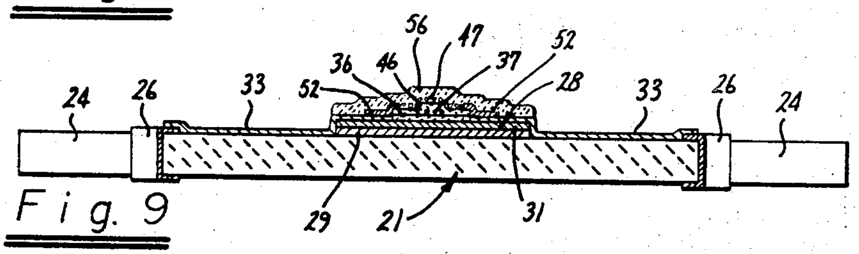
F i g. 9
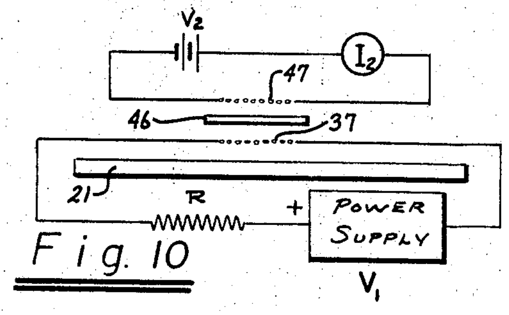
F i g. 11
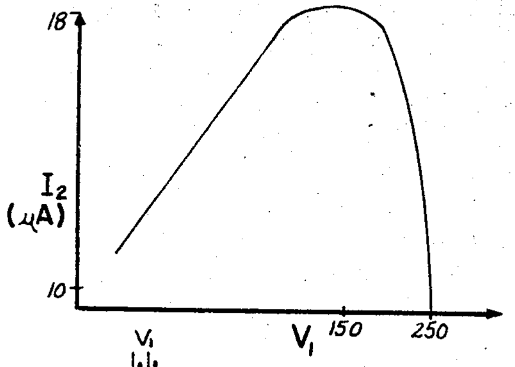
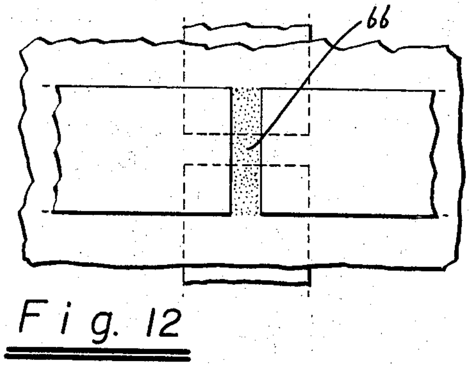
F i g. 12
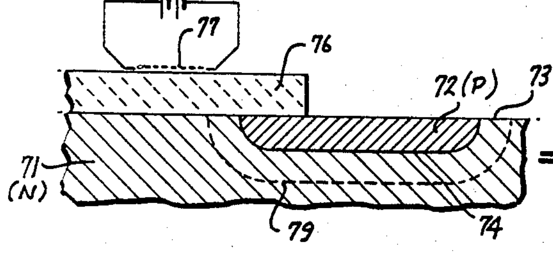
F i g. 13
INVENTOR.
Francis P. Fehlner
BY Flehr, Hohbach, Test, Albritton & Herbert
Attorneys

ACTIVE THIN FILM DEVICE BASED ON CROSSED DISCONTINUOUS THIN FILMS AND METHOD

CROSS-REFERENCES TO RELATED APPLICATIONS

This application is a continuation-in-part of application Ser. No. 163,887, filed July 19, 1971, now abandoned.

BACKGROUND OF THE INVENTION

Although active devices have heretofore been provided in the form of semiconductors, active devices based on thin films heretofore have not been available. There is a need for such devices which can be integrated with other thin film technology.

SUMMARY OF THE INVENTION AND OBJECTS

The above thin film device comprises a solid state electron structure. A relatively thin layer of electronically pervious insulating material has at least one discrete portion of electronically pervious conductive material disposed on the insulating material. At least one additional discrete portion of electronically pervious conductive material is disposed on the insulating material. The first named and additional portions in combination with the layer of insulating material form first and second conductive regions. The first and second conductive regions are substantially free of normal electric fields. Means is provided for applying a voltage to the first conductive region to cause electron injection therefrom into the insulating layer to thereby affect the conductivity of the second conductive region and thereby obtain unilateral operation. Voltage means applied to the second conductive region causes electron injection from each conductive region into the insulating layer to affect current flow in the other conductive region to thereby obtain bilateral operation.

In general, it is an object of the present invention to provide an active thin film device which is compatible with other thin film technology.

Another object of the invention is to provide a device of this character which can be utilized for performing functions previously performed by transistors and diodes.

Another object of the invention is to provide an active thin film device which is bilateral in that it functions in both forward and reverse directions.

Another object of the invention is to provide a device of the above character which can withstand relatively high voltages.

Another object of the invention is to provide a device of the above character which can operate in relatively high temperatures.

Another object of the invention is to provide a device of the above character which can withstand and operate in relatively high radiation environments.

Another object of the invention is to provide a method for operating the device to perform useful functions.

Additional objects and features of the invention will appear from the following description of the preferred embodiments of the invention as hereinafter set forth.

BRIEF DESCRIPTION OF THE DRAWING

FIG. 7 is another top plan view showing additional steps in fabrication of the device.

FIG. 9 is a cross-sectional view of the completed device taken along line 9—9 of FIG. 7.

FIG. 10 is a schematic diagram of the device showing it connected to electrical circuitry.

FIG. 11 is a graph showing electrical characteristics of the device as connected in FIG. 10.

FIG. 12 is a partial top plan view showing an alternative embodiment of the present invention.

FIG. 13 is a side elevational view showing the device utilized in conjunction with a semiconductor structure.

DESCRIPTION OF THE PREFERRED EMBODIMENTS

The active thin film device incorporating the present invention was fabricated by first taking a substrate 21 formed of a suitable material such as Corning Glass Works Code 7059 glass having suitable dimensions such as 1×3 inches. The substrate is provided with first and second planar spaced parallel surfaces 22 and 23. A pair of spaced parallel slots 24 are formed in each end of the substrate 21. A conducting film 26 is formed on the substrate 21 which is adjacent the inner end of each of the slots 24 and extends through the slot and is disposed on both of the surfaces 22 and 23 so that contact can be made between the surfaces 22 and 23 without the necessity of passing wires or conductors over the outer extremities of the substrate 21. Conducting film 26 can be formed in a suitable manner such as by use of a platinum paste which is placed in the desired position on the substrate 21 and then fired onto the substrate at a suitable temperature as, for example, at 500° C.

Figure 2:
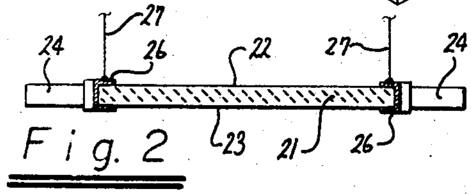
FIG. 2 is a cross-sectional view taken along the line 2—2 of FIG. 1.

After the thin film contacts 26 have been formed, conducting leads 27 are secured to the contact pads in a suitable manner such as by soldering them to the contact pads 26 as shown in FIG. 2.

Figure 1:
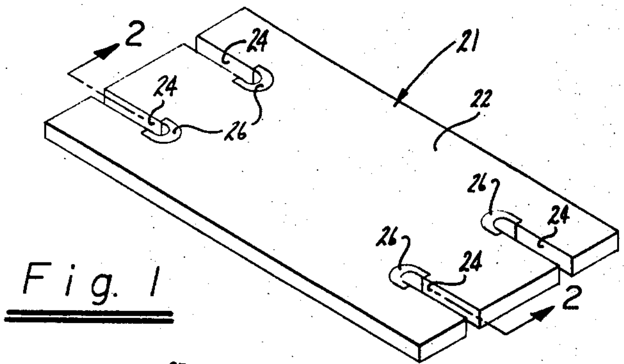
FIG. 1 is an isometric view showing a substrate utilized in fabricating the active thin film device.

After the steps shown in FIGS. 1 and 2 have been completed, the substrate is thoroughly cleaned and then placed in a vacuum system in preparation for the deposition of thin film circuits as hereinafter described. The substrates are baked out in a vacuum system for a period. typically in the vicinity of 8 hours at 200° C. until the pressure in the vacuum system has dropped to below $1 \times 10^{-6}$ Torr while the substrate is held at 200° C.

Figure 3:
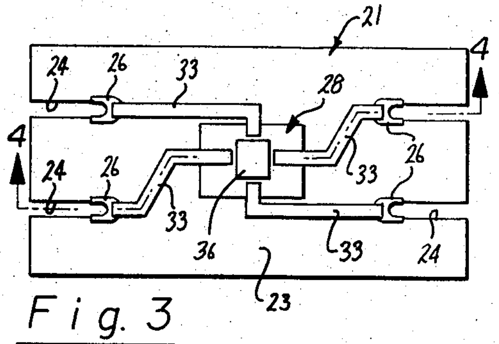
FIG. 3 is a plan view showing the fabrication of the leads for the device.

In order to ensure a flat reproducible surface on the substrate 21 having the same characteristics as the insulating film which separates the two discontinuous films hereinafter described, an insulating pad 28 is provided on the surface 23. This is accomplished while the substrate 21 is still in the vacuum chamber by evaporating a layer 29 of boric oxide ($B_2O_3$) from a boat source within the vacuum chamber and thereafter a layer 31 of silicon monoxide (SiO) evaporated from a chimney source within the vacuum chamber through a large mask having a rectangular opening therein to provide the rectangular pad 28 as shown in FIG. 3. The layers 29 and 31 can be evaporated to any suitable thickness as, for example, 1,000 to 5,000 Angstroms each.

Figure 4:
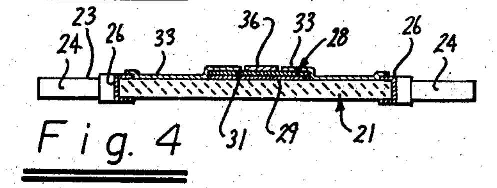
FIG. 4 is a cross-sectional view taken along the line 4—4 of FIG. 3.

Leads 33 are then evaporated on the surface 23 and onto the pad 28 as shown in FIGS. 3 and 4 which are connected to the thin film contact pads 26. The leads have their inner extremities terminating adjacent an area in which the discontinuous thin films are to be deposited as hereinafter described. The leads 33 can be formed in a suitable manner such as by evaporating palladium in a vacuum chamber to form leads which generally overlie the pad 28 and which are in contact with the platinum contact thin film pads 26. The palladium leads are evaporated to opaqueness as indicated by an optical thin film monitor and also so that they are very conducting.

After the leads 33 have been formed, a small pad or layer 36 of a suitable insulating material such as silicon monoxide is deposited through a small mask having a rectangular opening therein to provide a pad 36 which is disposed on the pad 28 between the inner extremities of the leads 33. This layer 36 is evaporated to a thickness of several thousand Angstroms.

Figure 6:
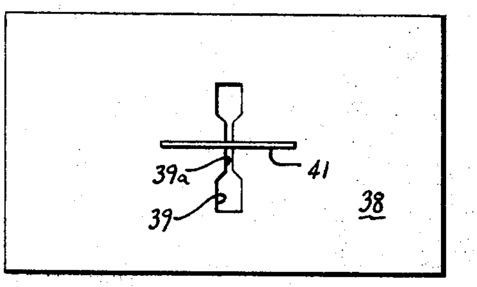
FIG. 6 is a top plan view of a mask utilized in performing the steps shown in FIG. 5.

A first discontinuous thin film 37 of a suitable material such as palladium is evaporated onto the pad 36 by the use of a wire shadow mask of the type shown in FIG. 6. The mask shown in FIG. 6 consists of a suitable material such as sheet 38 of stainless steel which has an elongate opening 39 formed therein extending laterally in the sheet. The opening 39 is provided with a necked down portion **39*a* intermediate the ends of the same across which a wire 41 in the form of a cylinder is disposed. The wire is secured to the sheet 38 by suitable means such as solder. As will be noted, this mask produces a very small area of discontinuous film which, in fact, is the area of the opening 39*a* which is shaded by the wire 41. Since a greater degree of evaporation is necessary to produce a discontinuous film in the shadow of wire 41, the remaining open area 39 is a continuous thin film. To obtain the desired thickness for the discontinuous thin film 37, the actual film thickness is monitored by an optical monitor and at the same time the resistance of the film is measured while the substrate is at 200° C. The resistance measured must be greater than 1,000 ohms/square at room temperature to ensure that the metal film is discontinuous. Thus, by way of example, if the discontinuous thin film being formed is the equivalent of 10 squares in parallel with an overall film resistance of 100 ohms, it can be seen that each square must have a resistance which is substantially equal to 1,000 ohms per square at room temperature and, therefore, must be discontinuous. During the time that the discontinuous thin film is being evaporated, additional palladium is being deposited over the top of the inner extremities of the leads 33 to provide lead extensions or electrodes 42 which are in contact with the discontinuous thin film 37.**

Figure 8:
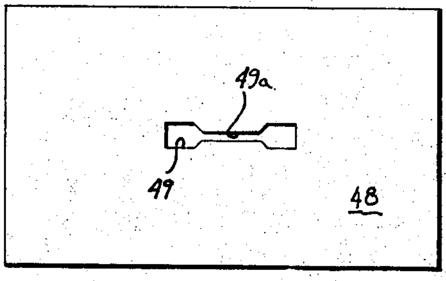
FIG. 8 is a top plan view of the mask utilized in conjunction with the steps shown in FIG. 7.
Figure 5:
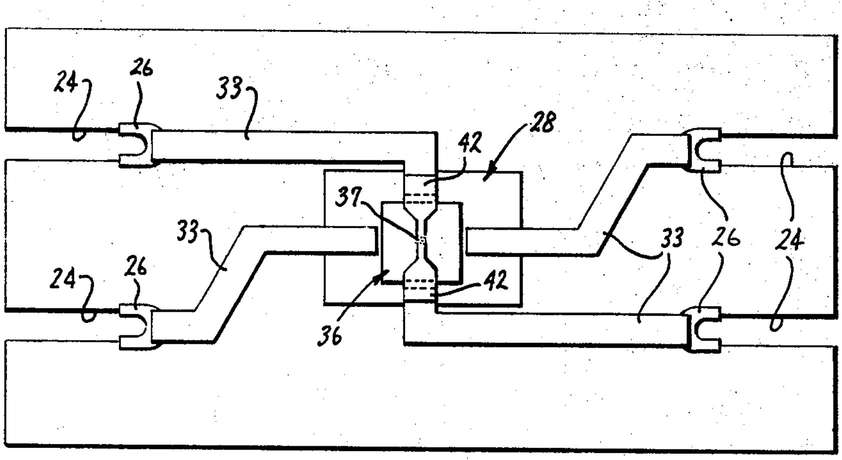
FIG. 5 is a plan view showing additional steps in fabricating the device.

Another pad or layer 46 of a suitable insulating material such as silicon monoxide is evaporated through the same mask which was utilized for forming the pad or layer 36. The layer 46 is formed on top of the lead extension 42 and the first discontinuous thin film 37 to a thickness of approximately 1,000 Angstroms. A second discontinuous thin film 47 is then formed on the layer 46 by evaporating palladium through a mask of the type shown in FIG. 8 consisting of a sheet 48 which is provided with an elongate hole 49 extending longitudinally thereof and having a necked down portion **49*a* intermediate the ends of the opening. The second discontinuous film 47 is formed in the total area of the mask opening with the active area being restricted to the necked down portion 49*a* by the lead extensions or electrodes 52 also formed of palladium which are at right angles to the extensions 42 and make contact with the inner extremities of two of the leads 33 as shown in FIG. 7.**

The formation of the second discontinuous thin film 47 is continuously monitored optically and by measuring the resistance. Evaporation was stopped when the resistance reached 95,000 ohms. This second discontinuous film can also be formed using a wire shadow mask similar to that in FIG. 6. This formation of the second discontinuous thin film in the same manner as thin film 37 provides a symetrical structure suitable for bilateral operation.

After completion of the first and second discontinuous films, the device can be protected or encapsulated by overcoating it with a protective layer 56 formed of a suitable material such as silicon monoxide. This protective layer 56 generally covers the same area which was covered by the pad or layer 28.

Operation of the device may now be briefly described as follows in conjunction with FIG. 10 in which the device is schematically illustrated with the discontinuous thin film 37 being connected to a power supply $V_1$ as shown through a resistor R of a suitable value as for example 50K ohms. Similarly, the discontinuous thin film 47 is connected to a battery identified as $V_2$ and the current flow is measured by a meter $I_2$.

In operation of the active thin film device connected in the same manner shown in FIG. 10, it is found that the current normal to the surface which passes through the silicon monoxide layer 46 separating the two discontinuous thin films 37 and 47 is a function of the lateral tunneling current passing through the lower discontinuous thin film 37 that is supplied from an independent power supply. Looking at the graph shown in FIG. 11 it can be seen that initially $I_2$ increases as $V_1$ is increased. However, upon further increase in $V_1$; $I_2$ decreases. This curve shows that the conductivity through the discontinuous thin film layer 47 changes as the power supply voltage $V_1$ is increased thereby providing unilateral operation. Conducting from island to island in the discontinuous thin film 36 occurs by tunneling via the insulating substrates 36 and 46. Hence, conduction through a discontinuous thin film injects charge carriers into traps and/or the conduction band of the insulating layer 46. When the layer is thin enough, the movement of these charge carriers occurs and is sensed by the moving charge carriers in discontinuous thin film layer 47. The two discontinuous thin films 37 and 47 thereby interact with each other via the charge carriers in the insulator 46 which divides them. The conduction through and normal to the silicon monoxide layer 46 is believed to be caused by electron injection unaided by external electric fields normal to the thin films. The films are connected to independent circuits and have no voltage potential applied between them to create a normal electric field. Electron injection may as a result of the injection process result in a small residual field being exhibited across the insulator 46. But the injection process occurring when a voltage means is applied across a discontinuous thin film is well known. Thus, here the residual field does not cause the injection. The lower silicon monoxide film 36 and the insulating film 46 are both substrates insofar as the bottom discontinuous film 37 is concerned. Therefore, tunneling electrons must be passing laterally through the silicon monoxide films 36 and 46 from island to island in the bottom discontinuous film. These electrons, in turn, become available for normal conduction through the silicon monoxide film 46. A small part of the increase in $I_2$ caused by an increase in $V_1$ is believed to be due to thermal heating of the insulator 46 by the lateral current in film 37. Thus increased current in film 47 is believed to be due to thermal heating of the silicon monoxide layer 46. This effect is compensated by electron injection into insulator 46, which in the case shown in FIG. 10, decreases the current in film 47 because the polarities of $V_1$ and $V_2$ are such that they oppose each other. If the polarity of $V_2$ were reversed, then electron injection into insulator 46 by a current through film 37 would increase the current through film 47 because the polarities of $V_1$ and $V_2$ would reinforce each other.

The thermal effect versus the electronic effect have been differentiated using the circuit shown in FIG. 10 in which two independently accessed discontinuous thin films 37 and 47, have been found to interact with each other through the separating dielectric film 46, even though no voltage potential or electric field is applied across the film 46. The bottom discontinuous metal film 37 is connected to a power supply as show in FIG. 10 through a current limiting resistor R of a suitable value as for example 50,000 ohms. The power supply can be a battery and ammeter or a Tektronic Model 575 transistor tracer. The second discontinuous thin film 47 is monitored by a fixed bias $V_2$ of opposing polarity to the power supply $V_1$ and an ammeter $I_2$. It was found that when a current was passed through the bottom film 37, it changed the magnitude of the current flowing through the top film 47 as shown in FIG. 11. Initially, the current in the top film increased due, it is believed, to thermal heating by the bottom film 37 of the dielectric film 46 which in turn heated the top film 47. However, as voltage $V_1$ and thereby current was increased further on the bottom film 37, current flow in the top film 47 reached a maximum and then decreased to less than its initial value. It is believed that the only logical explanation is that the thermal effect is being opposed by an electronic effect which causes the reversal of direction of change in the resistance of the top film 47. Thus, the flow of electrons in the top film 47 is opposed by the flow of electrons in the bottom film 37 acting through dielectric 46. Both thermal and electronic effects occur simultaneously, but the thermal effect dominates the initial behavior of the circuit as shown in FIG. 11 while the electronic effect dominates the behavior when higher voltages are applied across bottom film 37. This change occurs because of the nonlinear I-V characteristics of both the discontinuous thin films themselves and of the silicon monoxide layer separating them. Such characteristics make it possible to use the crossed discontinuous film device as an amplifier.

Conversely, in bilateral operation a current change introduced in the top film 47 in FIG. 10 produces a change in the current in the bottom film 37.

It is possible of course to introduce a signal into the crossed discontinuous thin film amplifier in several ways. Signal means is supplied in FIGS. 10 and 11 by increasing the power supply voltage $V_1$. As previously discussed the electron injection process results in a small residual field being exhibited across the insulator 46. Modification of this field by signal means applied between the film 37 and film 47 circuits would be another way of applying signal means. Once introduced the input signal becomes amplified so the active thin film device can be utilized for replacing other solid state devices such as diodes or transistors. The amplification provided by the thin film device would have a majority carrier analogy to a transistor in which minority carriers are injected into a reverse biased P-N junction.

The crossed discontinuous metal thin film device has a number of possible applications. One of the discontinuous metal films can be considered to be an electronic device in the form of a resistor which is affected by injected electrons produced by passage of a lateral current through the other thin film. Other electronic devices can be similarly controlled as hereinafter described. The active thin film device can be utilized for replacing other solid state devices such as diodes and transistors. The nonlinear I-V characteristic of an insulator such as silicon monoxide permits the use of this particular effect to obtain amplification of power in such a circuit.

The present crossed discontinuous thin film device has an advantage over active devices such as transitors because they would be compatible with other thin film technology so that circuits could be formed completely of thin film devices to thereby permit miniaturization of the same. Although a transistor can be miniaturized, it requires the use of a back biased junction. Because of the manner in which the crossed discontinuous thin film device is constructed and the use of insulating layers, its high voltage characteristics would be substantially superior to that of a device based on silicon diffused junctions. The majority carrier nature of the thin film device would also make it less sensitive to temperature and radiation damage than a minority carrier device such as a bipolar transistor.

The interaction between the two discontinuous thin films separated by an insulating layer indicates that many types of electronically pervious electron devices could be affected by charge carriers injected from a discontinuous thin film separated from a particular device by an electrically pervious insulator. For example, a discontinuous thin film could be used to trigger a negative resistance device. In addition, components of an integrated circuit in silicon could also be affected by a discontinuous thin film electrically isolated from a component in the silicon base.

In order to obtain better interaction between the two discontinuous thin films, it may be desirable to form both of the discontinuous thin films by the use of a shadow mask of the type shown in FIG. 6. The resulting cross-over pattern 66 is shown in FIG. 12 in which a total width of the top discontinuous film is affected by the bottom discontinuous film so that the overall interaction between the two films is improved to thereby also improve the amplification which occurs.

Another embodiment of the invention is shown in FIG. 13 in which there is provided a semiconductor body 71 of a suitable type such as one formed of silicon and doped with an N-type impurity. A P-type region 72 is diffused downwardly from a planar surface 73 into the body 71 and is defined by a dish-shaped P-N junction 74 which extends to the surface 73. If desired, the region 72 can be formed by ion implantation rather than diffusion. An insulating layer 76 of suitable material such as silicon dioxide is formed on the surface 73. A discontinuous thin film 77 of the type hereinbefore described is provided on the surface of the insulating layer 76. The discontinuous thin film 77 is separated from the semiconductor body 71 by the thermally grown insulating layer 76 which can be relatively thin as, for example, not greater than 100 Angstroms so that the laterally tunneling electrons going through the discontinuous thin film 77 would interact with the depletion layer 79 of a back biased P-N junction 74. The electrons so injected into the dielectric and thence into the depletion layer would lead to conduction through the back biased diode. Again, because of the nonlinear characteristics of this conduction, amplification of the signal applied to the discontinuous thin film will occur.

Another similar application of the same invention would be to utilize the discontinuous thin film over a very thin silicon dioxide layer overlying highly doped regions of a semiconductor device. In operation of the device, the electrons would be injected into and through the insulating layer and enter into the highly doped regions which would be utilized as means for triggering a back-biased diode without contacting the silicon. Thus, the device would be similar to a four-layer diode.

Another application of the same invention would be to utilize the discontinuous thin film over a thin silicon dioxide layer overlying the channel region between the source and drain of a field-effect transistor. Electrons tunneling laterally through the insulating layer would trigger conduction between the source and drain.

From the foregoing, it can be seen that there has been provided a novel device utilizing discontinuous thin films which can be utilized to trigger or to affect a second electronic element whether it be a resistor, semiconducting glass switch or a P-N junction device. The discontinuous thin film device has advantages in that it is compatible with other thin film techniques. In addition, it can withstand high temperatures, high radiation doses and relatively high voltages.

I claim:

1. In a solid state electron structure a relatively thin layer of electronically pervious insulating material, a first conductive region formed in said insulating material including a discontinuous thin film formed of electronically pervious conductive material disposed on and in combination with said insulating material, a second conductive region formed in said insulating material including a portion of electronically pervious conductive material disposed on and in combination with said insulating material, said first and second conductive regions being substantially free of normal electric fields, said regions being isolated from direct electrical connection and being physically spaced to provide a corresponding electronic interaction between said first and second regions, and voltage means applying a voltage to one of said conductive regions to cause electron injection therefrom into said insulating layer to thereby affect the conductivity of the other conductive region.

2. A structure as in claim 1 wherein the second conductive region includes a semiconductive material.

3. A structure as in claim 1 wherein the voltage means applied to one conductive region is of sufficient magnitude to cause a nonlinear conductivity relationship in the second conductive region.

4. A structure as in claim 1, together with additional voltage means for applying a voltage to the second conductive region to cause electron injection from each conductive region into said insulating layer to thereby affect current in the other conductive region whereby bilateral operation is obtained.

5. A structure as in claim 1 wherein said second conductive region includes an additional discontinous thin film.

6. A structure as in claim 5, wherein said insulating material is disposed between said first named film and said additional discontinuous film.

7. A structure as in claim 5 wherein said first named and additional discontinuous thin films have portions which overlie each other.

8. A structure as in claim 7 wherein a portion of said first named discontinuous thin film overlies at substantially right angles a portion of said additional discontinuous film.

9. A structure as in claim 6 wherein said discontinuous thin film has a resistivity in excess of 1,000 ohms per square at room temperature.

10. In an active thin film device, a substrate formed of an insulating material, first and second discontinous thin films carried by the substrate, said films being formed independent of each other and isolated from direct electrical connection, a relatively thin layer of insulating material disposed between said first and second discontinuous thin films, said discontinuous thin films overlying each other but being separated from each other by said relatively thin layer of insulating material, leads carried by the substrate and making independent contact with each of said first and second discontinuous thin films, and means for encapsulating said thin films.

11. A device as in claim 10 wherein said discontinuous thin films are formed of palladium and wherein said relatively thin layer of insulating material is formed of silicon monoxide.

12. A device as in claim 10 wherein said layer of insulating material has a thickness of less than approximately 1,000 Angstroms.

13. In a method for forming an active thin film device, providing a substrate of insulating material having a surface thereon, forming on said surface a portion of electronically pervious conductive material, thereby forming a first conductive region, forming a relatively thin layer of insulating material on said conductive region and forming a discontinuous thin film on said relatively thin layer of insulating material, generally overlying said first conductive region and isolated from direct electrical connection with said conductive material thereby physically spacing said conductive material and said film.

14. A method as in claim 13 wherein said portion forming said first conductive region is a semiconductive material.

15. A method as in claim 13 wherein said portion is an additional discontinuous thin film.

16. A method as in claim 15 wherein both of the first named and additional discontinuous thin films are formed by the use of shadow masks.

17. A method as in claim 16 wherein said discontinuous thin films are formed at a temperature of 200° C and above.

18. A method as in claim 16 wherein leads establishing a connection with each of the discontinuous thin films are formed at the same time that the respective discontinuous thin film is formed.

19. In a method for affecting conductivity in a solid state electron structure, providing a relatively thin layer of electronically pervious insulating material, forming a first conductive region in said insulating material including a discontinuous thin film of electronically pervious conductive material formed on and in combination with said insulating material, forming a second conductive region in said insulating material including a portion of electronically pervious conductive material formed on and in combination with said insulating material, said regions being physically spaced to provide a corresponding electronic interaction between said first and second regions, maintaining each of the first and second conductive regions substantially free of normal electric fields, and applying a voltage to one of said conductive regions to cause electron injection therefrom into said insulating layer to thereby affect the conductivity of the other conductive region.

20. In a method for affecting current in a solid state electron structure, a method as in claim 19 together with applying an additional voltage to the second conductive region wherein the path between the first and second conductive regions provides a nonlinear characteristic so that the signal applied to the first conductive region is amplified in passing from the first to the second conductive region.

21. In a method for affecting current in a solid state electron structure, a method as in claim 19, together with applying an additional voltage to the second conductive region to cause electron injection from each conductive region into said insulating layer to thereby affect current in the other conductive region whereby bilateral operation is obtained.

22. A method as in claim 21 wherein the path between the first and additional conductive regions provides a nonlinear characteristic so that a signal applied to each conductive region is amplified in passing from each conductive region to the other electronically pervious conductive region.

* * * * *